Patented Aug. 13, 1935

2,010,884

UNITED STATES PATENT OFFICE 2,010,884

COLORATION OF MATERIALS

Henry Charles Olpin and George Holland Ellis, Spondon, near Derby, England, assignors to Celanese Corporation of America, a corporation of Delaware No Drawing. Application August 15, 1933, Serial No. 685,230. In Great Britain September 24, 1932

20 Claims. (Cl. 8—5)

This invention relates to the production of colorations on materials and more particularly to the coloration of textile materials made of or containing cellulose acetate or other cellulose ester or ether especially by the azoic process.

The coloration of cellulosic materials by the azoic process has long been practiced on an extensive scale, and as an example may be mentioned the production of the well known para-nitraniline red on cotton materials from diazotized para-nitraniline and β-naphthol.

During the past decade the scope of the azoic process has been very largely extended by the introduction of new coupling components, more particularly arylamides of 2:3-oxynaphthoic acid and the diaceto-acetyl derivatives of aromatic diamines, of which the diaceto-acetyl-ortho-tolidine is probably the best known example. By the use of these coupling components in conjunction with diazo compounds, especially those of the benzene and naphthalene series, a wide range of colorations has been produced, many of which colorations exhibit properties of outstanding fastness, particularly to the action of light or to the action of hot soap solutions.

It has now been found that dyestuffs of great value can be obtained by coupling with coupling components containing a CH$_2$CO grouping capable of reacting with a diazo compound or by coupling with phenols diazo compounds obtainable by the diazotization of nitro-amino derivatives, especially ortho-nitro-amino derivatives, of compounds containing two or more aryl radicles or aromatic residues, two of which are united by a single linkage other than a linkage by nitrogen alone, and particularly by coupling with said coupling components diazo compounds obtainable by the diazotization of ortho-nitro-mono-amino compounds containing two aryl radicles or aromatic residues linked directly, as for example in diphenyl. It has further been found that by working according to the azoic method, as opposed to the treatment of the materials with the dyestuffs in substance, colorations of increased brilliance may be obtained, while by selection of suitable coupling components and working according to the azoic method, yellow colorations of outstanding value as regards fastness to light and soaping may be obtained. The second aryl residue further appears to impart additional lack of volatility to the dyestuffs as compared with dyestuffs derived from diazotizable amino compounds having only a single aromatic residue.

The present invention, therefore, comprises broadly the production of dyestuffs by diazotizing nitro-amino compounds and particularly ortho-nitro-amino compounds containing two or more aryl radicles or aromatic residues, two of which are united by a single linkage, other than a linkage through nitrogen alone, and coupling with coupling components containing a CH$_2$CO grouping capable of reacting with a diazo compound or coupling with phenols, and particularly by diazotizing ortho-nitro-mono-amino-diphenyls and other ortho-nitro-mono-amino-diaryls and coupling with said coupling components.

The dyestuffs of the present invention may in some cases be applied in substance, or they may be produced on the fibre, for example by the azoic method, when valuable colorations are obtained, and the present invention includes within its scope the production of colorations on materials, and particularly on materials made of or containing cellulose esters or ethers, with the aid of the new dyestuffs whether applied in substance or by azoic methods.

The amino-diaryl compounds employed in the production of the new dyestuffs may or may not contain other substituent groups in the nuclei, for example halogen, hydroxy, alkoxy, alkyl, or they may contain non-diazotizable amino groups, e. g. alkylamino, arylamino, or acidylamino groups. Preferably, however, they should contain a nitro group. Particular mention may be made of the nitro-amino-diaryl compounds containing a single diazotizable amino group in which the amino group is in an ortho position to a nitro group. Such ortho-nitro-mono-amino-diaryl compounds, and especially those in which the aryl nuclei are linked directly, are of especial importance for the production of the dyestuffs and colorations of the present invention.

The amino diaryl compounds may contain two or more aryl nuclei linked together directly as in the case of diphenyl and other diaryls or indirectly. Thus for example the aryl nuclei may be linked through the groupings —CO.NH— or —NH—. Again, the aryl nuclei may be linked indirectly by groupings containing no nitrogen such for example as —CH$_2$—, —CO—, or through single atoms such for example as oxygen or sulphur, or through other atoms or groupings other than nitrogen alone.

Examples of nitro-amino-diaryl compounds which may be used in the production of dyestuffs in accordance with the present invention are 3-nitro-4-amino-diphenyl, 3-nitro-4-amino-4'-chlor-diphenyl, 4'-Brom-3-nitro-4-amino-diphenyl, 5-nitro-2-amino-diphenyl, 2'-nitro-4-amino-diphenyl, 2-nitro-4-amino-4'-Brom-diphenyl, 3:4'-dinitro-4-amino-diphenyl, 3:3'-dinitro-4-amino-4'-chlor-diphenyl, 3-nitro-4-amino-4'-chlor-diphenyl-ether, 2-nitro-4-benzoylamino-aniline, 3-nitro-4-amino-diphenyl-ketone, 5-nitro-2-amino-benzophenone, 5-nitro-2-amino-benzanilide and the nitro-mono-amino-diphenyl methanes.

As has been indicated, the amino-diaryl compound is diazotized and coupled with phenols and with bodies containing a $CH_2CO$ group capable of reacting with a diazo compound. Especial mention may be made of phenols which contain no auxochromic group, particularly salt-forming auxochrome, beyond the hydroxyl group, and of pyrazolone derivatives or acidyl acetic esters or acidyl acetic amides or substituted amides or other $\beta$-keto acidyl compounds and other compounds containing a $CH_2CO$ grouping capable of reaction with diazo compounds. The simpler coupling components such for example as phenol and 1-phenyl-3-methyl-pyrazolone yielding mono azo dyes are of particular value where dyestuffs applicable in substance are desired and yield colorations of good fastness to light.

The coupling components yielding dyestuffs of outstanding value, especially when coupled with ortho-nitro-mono-amino compounds containing two aryl nuclei linked directly, are, however, the di-$\beta$-keto acidyl derivatives of aromatic diamines, for example the diaceto-acetyl derivatives of ortho-tolidine or other aromatic diamine. These coupling components when coupled on cellulose acetate materials for instance with diazotized 4'-chlor-3-nitro-4-amino-diphenyl yield yellow colorations of outstanding fastness.

In effecting coloration of materials they may, where possible, be colored directly by the application of the dyestuff for example in solution or dispersion, or, alternatively, the dyestuff may be prepared on the materials themselves. Thus for example cellulose acetate materials may be treated first with a dispersion of the coupling component and then with the diazo solution, or the diazo component may first be applied, diazotized on the material and thereafter developed. Again, if desired, both diazo component and coupling component may be applied to the materials and diazotization and coupling effected thereon. In the latter case the amine and coupling component may be applied together or separately as may be desired or convenient. In practice it is found particularly advantageous in the production of colorations on cellulose ester and other materials to apply both diazo and coupling components from a single bath in which they are present in the dispersed state, while a further method which has been found of great practical utility is to apply one or both components by padding or other method of mechanical impregnation, the components being fixed on the materials if desired for requisite by steaming, for example as described in U. S. application S. No. 645,039 filed 30th November, 1932.

In the coloration of cellulosic materials by the azoic method the coupling component may often be conveniently applied in the form of a salt. Thus for example a phenolic or keto-methylene coupling component may conveniently be applied to cotton in the form of its sodium salt. Where both components are applied to the materials prior to diazotization, diazotization may be effected by treating the materials with a suitable acidified nitrite solution. Thereafter, if desired, to complete the coupling, the material may be subjected to an alkaline treatment, particularly to the action of a weakly alkaline bath such as a very dilute sodium carbonate solution.

As has been indicated, where the dyestuffs have direct affinity for the materials they may be applied from dispersions or solutions. The dispersions of the dyestuffs (or of the diazo or coupling components when azoic methods are used) may be obtained by any desired method, for example by milling or grinding with or without the aid of dispersing agents and/or protective colloids, or by precipitation in the presence of protective colloids, or by a simple treatment with dispersing agents as described in any of the prior U. S. Patents Nos. 1,618,413, 1,618,414, 1,694,413, 1,690,481, 1,803,008, 1,840,572, 1,716,721 and U. S. applications S. Nos. 390,423 and 390,424 filed 4th September, 1929. In some cases the dispersion of coupling components may be facilitated by the presence of small quantities of alkali, for example a quantity of caustic soda sufficient to yield a preparation of about pH 8.0-8.5 or even slightly more alkaline. The amount of alkali employed should not, however, be such as deleteriously to affect the materials to be treated or dyed subsequently.

The absorption of the dyestuffs, which, for the coloration of cellulose ester or ether materials should preferably be unsulphonated, or of either or both components by the cellulose ester and ether materials may be facilitated if desired by incorporating swelling agents in the dyeing or padding liquors or printing pastes employed, or the materials may be pretreated with swelling agents. Alcohol is particularly suitable for this purpose, though other swelling agents may be employed if desired.

The following table shows two of the various shades obtainable by azoic methods on cellulose acetate in accordance with the present invention.

| Amine | Developer | Shade on cellulose acetate |
| --- | --- | --- |
| 4'-chlor-3-nitro-4-amino-diphenyl. | Naphthol AS/G | Golden yellow. |
| Do | Phenylmethyl-pyrazolone. | Yellow—redder than above. |

The following examples illustrate the invention without being in any way limitative.

*Example 1*

500 grams of a 10% aqueous suspension of 3-nitro-4-amino-4'-chlor-diphenyl are heated with 250 grams Turkey red oil (50%), and diluted with boiling 2.5 grams per litre soap solution. The resulting mixture is then strained into a dyebath containing 300 litres of a 1 gram per litre soap solution. A solution containing 100 grams of diacetoacetyl-ortho-tolidine dissolved in hot water containing 50 grams of caustic soda is added to the dyebath and the whole heated to a temperature of 70° C. and 50 grams of a concentrated aqueous solution of glucose added.

10 kilos of cellulose acetate yarn in hank form are entered into the above dyebath and treated for 1½ hours at 75–80° C. The yarn is then lifted, rinsed and worked for 1½ hours in the cold in a 30:1 bath containing 4 grams per litre of sodium nitrite and 8 grams per litre of acetic acid. The yarn is then rinsed, entered into a ¼ gram per litre soap solution in the cold and the temperature slowly raised to 70° C. and maintained thereat for 1 hour and is finally lifted, washed and dried or otherwise treated as is desired or requisite. The yarn is colored in a yellow shade of good fastness, particularly to washing.

*Example 2*

The diaceto-acetyl-ortho-tolidine employed in Example 1 is replaced by an equal weight of ortho-chlor-phenyl-methyl-pyrazolone and 10 kilograms of cellulose acetate yarn are dyed following exactly the same procedure. The yarn is dyed in a yellow shade of good fastness, particularly to washing.

*Example 3*

1000 grams of a 10% aqueous suspension of 3-nitro-4-amino-diphenyl ether are heated with 500 grams of Turkey red oil (50%) and diluted with boiling 2.5 grams per litre soap solution, and are then strained into a dyebath containing 300 litres of a 1 gram per litre soap solution.

10 kilos. of a cellulose acetate knitted fabric in rope form are entered into the above dyebath and the temperature raised over a period of ¾ hour to 75–80° C. and maintained thereat for a further ¾ hour. The goods are then washed off and entered into a cold 30:1 bath containing 2 grams per litre of sodium nitrate and 7 ccs. per litre of 30% hydrochloric acid. After working in this bath for ½ hour the goods are washed off and entered into a cold 30:1 bath which has been prepared by boiling 100 grams of phenol with 10 times its weight of water and pouring into the coupling bath which contains ½ grams per litre of soap. When coupling is complete the goods are rinsed and dried or otherwise treated as is desirable or requisite. The fabric is dyed in a yellow shade of very good fastness to light.

The invention is of particular value in connection with the coloration of cellulose acetate materials. It may, however, be applied to the treatment of other materials for instance materials made of or containing esters of cellulose other than cellulose acetate, for example cellulose formate, propionate or butyrate or the materials obtainable by treating cellulose with esterifying agents while retaining its fibrous form, for example the product known as immunized cotton obtainable by treating alkalized cellulose with para - toluene sulphonic chloride. Cellulose ethers, for instance ethyl or benzyl, cellulose, may also be colored by the new coloring matters. Further the invention may be applied to the coloration of mixed materials containing for instance one or more of the foregoing esters or ethers of cellulose in conjunction with other types of artificial or natural fibres, e. g. cotton, regenerated cellulose, wool or silk. Such other artificial or natural fibres may, where they possess the requisite affinity, be colored by the azoic methods applied to the cellulose esters or ethers, or by any other desired methods. Again, colorations may be produced on other materials than cellulose derivative materials in accordance with the present invention.

What we claim and desire to secure by Letters Patent is:—

1. Process for the production of dyestuffs comprising coupling with a coupling component selected from the group consisting of the unsulphonated phenolic coupling components of the benzene series which are free from amino groups, and the unsulphonated pyrazolone coupling components, a diazo compound obtainable by the diazotization of an unsulphonated nitro compound containing two aryl radicles united directly by a single linkage, said compound containing a single diazotizable amino group.

2. Process for the production of dyestuffs comprising coupling with a coupling component selected from the group consisting of the unsulphonated phenolic coupling components of the benzene series which are free from amina groups, and the unsulphonated pyrazolone coupling components, a diazo compound obtainable by the diazotization of an unsulphonated nitro-mono-amino-diphenyl.

3. Process for the production of dyestuffs comprising coupling with a coupling component selected from the group consisting of the unsulphonated phenolic coupling components of the benzene series which are free from amino groups, and the unsulphonated pyrazolone coupling components, a diazo compound obtainable by the diazotization of an unsulphonated nitro-mono-amino-diphenyl in which the amino group and a nitro group are in the same phenyl group.

4. Process for the production of dyestuffs comprising coupling with a coupling component selected from the group consisting of the unsulphonated phenolic coupling components of the benzene series which are free from amino groups, and the unsulphonated pyrazolone coupling components, a diazo compound obtainable by the diazotization of an unsulphonated-ortho-nitro-mono-amino-diphenyl.

5. Process for the production of dyestuffs comprising coupling with phenol a diazo compound obtainable by diazotizing 3-nitro-4-amino-4'-chlor-diphenyl.

6. Process for the production of dyestuffs comprising coupling with 1-phenyl-3-methyl-pyrazolone a diazo compound obtainable by diazotizing 3-nitro-4-amino-4'-chlor-diphenyl.

7. Process for the coloration of textile materials comprising an organic derivative of cellulose comprising coupling on the materials a diazo compound obtainable by the diazotization of an unsulphonated nitro-amino compound containing two aryl radicles united directly by a single linkage and containing a single diazotizable amino group, with a coupling component selected from the group consisting of the unsulphonated phenolic coupling components of the benzene series which are free from amino groups, and the pyrazolone coupling components.

8. Process for the coloration of textile materials comprising cellulose acetate comprising coupling on the materials a diazo compound obtainable by the diazotization of an unsulphonated nitro-mono-amino compound containing two aryl radicles united directly by a single linkage, with a coupling component selected from the group consisting of the unsulphonated phenolic coupling components of the benzene series which are free from amino groups, and the pyrazolone coupling components.

9. Process for the coloration of textile materials comprising cellulose acetate comprising coupling on the materials a diazo compound obtainable by the diazotization of an unsulphonated ortho-nitro-mono-amino diphenyl, with a coupling component selected from the group consisting of the unsulphonated phenolic coupling components of the benzene series which are free from amino groups, and the pyrazolone coupling components.

10. Process for the coloration of materials comprising cellulose acetate, comprising coupling on the materials a diazo compound obtainable by diazotizing 3-nitro-4-amino - 4' - chlor-diphenyl with 1-phenyl-3-methyl-pyrazolone.

11. As new products unsulphonated azo compounds of the general formula R—R'—N=N—X wherein R and R' are aryl nuclei free from diazotizable amino groups and at least one of which contains a nitro group as a substituent, and X is the residue of a pyrazolone coupling component or of a phenolic coupling component of the benzene series which is free from amino groups.

12. As new products unsulphonated azo products of the general formula R—R'—N=N—X wherein R and R' are aryl nuclei free from diazotizable amino groups and in which R' contains a nitro group as a substituent in an ortho position to the azo group, and X is the residue of a pyrazolone coupling component or of a phenolic coupling component of the benzene series which is free from amino groups.

13. As new products unsulphonated azo compounds of the general formula

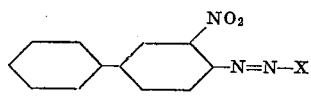

wherein X is the residue of a pyrazolone coupling component or of a phenolic coupling component of the benzene series which is free from amino groups.

14. As a new product the compound having the formula

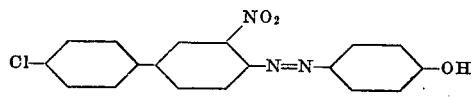

15. As a new product the compound having the formula

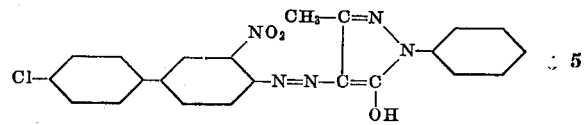

16. Textile materials comprising an organic derivative of cellulose and which have been colored by the production on the materials of a dyestuff claimed in claim 11.

17. Textile materials comprising cellulose acetate and which have been colored by the production on the materials of a dyestuff claimed in claim 11.

18. Textile materials comprising an organic derivative of cellulose and which have been colored by the production on the materials of a dyestuff claimed in claim 13.

19. Textile materials comprising cellulose acetate and which have been colored by the production on the materials of a dyestuff claimed in claim 13.

20. Textile materials comprising cellulose acetate and which have been colored by the production on the materials of a dyestuff claimed in claim 15.

HENRY CHARLES OLPIN.
GEORGE HOLLAND ELLIS.